Patented Mar. 8, 1932

1,848,264

UNITED STATES PATENT OFFICE

WILLARD E. MITCHELL, OF GREAT FALLS, MONTANA, ASSIGNOR TO ANACONDA COPPER MINING COMPANY, A CORPORATION OF MONTANA

PROCESS OF REMOVING GERMANIUM FROM ZINC SULPHATE SOLUTIONS

No Drawing. Application filed May 10, 1930. Serial No. 451,524.

My invention relates to the substantially complete removal of germanium from zinc sulphate solutions and particularly from solutions that are to be subjected to electrolysis for recovery of zinc.

Zinc sulphate solutions to be subjected to electrolysis are usually obtained by leaching roasted zinc ores, fumes or other basic zinc compounds, usually called zinc calcine, with dilute sulphuric acid which is usually obtained in the electrolysis of a preceding quantity of zinc sulphate. Zinc calcines that are available for this treatment commonly contain other metals or compounds of these metals as impurities. To prevent the dissolution of such impurities and to remove them as much as possible the calcine is leached in two stages, in the second of which it is treated directly with an excess of acid from the electrolytic tanks which is thereby largely, but not completely, neutralized. This partly neutralized acid is then used to leach an excess of the raw calcine so that the impurities that have been dissolved in the second or acid leach are largely precipitated in the first or neutral leach. The neutral leach does not, however, remove all of the impurities and the resulting zinc sulphate solution containing the remaining impurities must, therefore, be treated with other reagents and finally with zinc dust to remove these remaining impurities before the solution is subjected to electrolysis.

Germanium is one of the impurities contained in raw calcine. It is present in zinc concentrates in amounts varying from .001%, which is the lower assay limit, to .030%. It is also present in certain zinc oxide fumes in which it occurs in amounts varying from .030% to .100%. Certain fumes from lead smelters have also been found to contain germanium. Germanium is a serious impurity when it is present in concentrates, calcines or other metallurgical products in amounts greater than .001%.

When the calcine is subjected to leaching as in the steps mentioned above, the first or neutral leach dissolves very little germanium because at no time is the acid very strong in this leach, usually having a maximum of 3.0%, and because the leach itself acts as a partial purification. Some germanium is, however, dissolved in succeeding leaching steps. The leach solution from these acid leaches are mixed with the neutral leach for partial purification. This is an oxidizing purification in an acid solution which is subsequently neutralized with a large excess of zinc oxide calcine.

The zinc sulphate solutions must be purified before electrolysis to remove metals such as cadmium which are deposited with zinc and lower the grade of metal thus produced, and to remove impurities such as copper, arsenic, antimony, cobalt and germanium, which would prevent zinc from being deposited. These impurities are removed by treating the solutions with an excess of zinc dust, "blue powder", or other finely divided metallic zinc which, being more electropositive than the metals constituting the impurities, displaces the latter from the solution. In order to insure a sufficient removal of the impurities a considerable excess of zinc dust is required. The germanium remaining in the solution after the neutral leach must be removed in the next and last treatment of the solution prior to electrolysis which is the aforesaid purification with zinc dust.

The effect of germanium on the electrolysis of zinc sulphate solutions is to lower the hydrogen overvoltage of the zinc, thereby causing the zinc to re-oxidize and re-dissolve. This effect is even more apparent in the zinc dust purification where the germanium causes the oxidation of both the excess zinc dust present and the precipitated cadmium. These two oxides then react with zinc sulphate with the formation of basic zinc sulphate and cadmium sulphate. These reactions are represented as follows:—

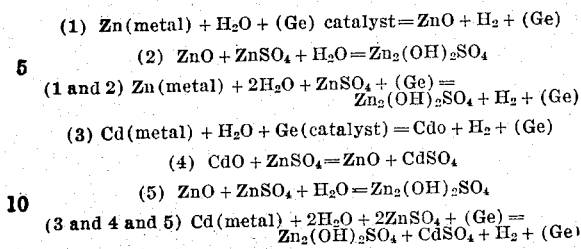

(1) Zn(metal) + H₂O + (Ge) catalyst = ZnO + H₂ + (Ge)

(2) ZnO + ZnSO₄ + H₂O = Zn₂(OH)₂SO₄

(1 and 2) Zn(metal) + 2H₂O + ZnSO₄ + (Ge) = Zn₂(OH)₂SO₄ + H₂ + (Ge)

(3) Cd(metal) + H₂O + Ge(catalyst) = CdO + H₂ + (Ge)

(4) CdO + ZnSO₄ = ZnO + CdSO₄

(5) ZnO + ZnSO₄ + H₂O = Zn₂(OH)₂SO₄

(3 and 4 and 5) Cd(metal) + 2H₂O + 2ZnSO₄ + (Ge) = Zn₂(OH)₂SO₄ + CdSO₄ + H₂ + (Ge)

Being catalytic reactions, relatively small amounts of germanium cause the precipitated cadmium to re-dissolve very rapidly and seriously reduce the amount of excess zinc dust present. For example, zinc sulphate solutions similar to that obtained by leaching were made up from chemically pure reagents to contain 45 grams of zinc, .05 grams of iron and 5.0 grams of manganese per liter. One of these solutions was electrolyzed directly and others were electrolyzed after the addition of varying small amounts of germanium sulphate. It was found that the presence of germanium to the extent of .0005 grams per liter reduced the ampere efficiency from 93.3% to 81.0%. When the quantity of germanium was .0010 grams per liter, the ampere efficiency fell to 72.5%. In similar solutions containing .005 grams of cobalt per liter the presence of .0005 grams of germanium per liter reduced the ampere efficiency from 92.8% to 71.6% and when germanium was present to the extent of .0010 grams per liter in such a cobalt-containing solution no zinc metal was obtained after electrolyzing for twenty four hours.

As pointed out above, the presence of germanium also prevents the removal of other impurities such as cadmium. For example, a solution containing 100 grams of zinc, .9 grams of copper, .25 grams of cadmium and .006 grams of cobalt per liter was treated with zinc dust, the quantity of cadmium per liter was reduced in one-half hour to .001 grams, this quantity rising to .004 grams after treatment for four hours. A similar solution containing in addition .0025 grams per liter of germanium when treated with zinc dust contained after one-half hour of treatment .010 grams of cadmium per liter which quantity rose after one hour's treatment to .089, then after two hours' treatment to .18 and with four hours' treatment to .25 grams per liter, the entire quantity of cadmium originally present. The object of my invention is therefore to remove the germanium from zinc sulphate and similar solutions and to reduce the quantity of germanium remaining in such solutions to a point below that at which it has a deleterious action on the purification and electrolysis of the solution.

When the calcine contains up to .001% of germanium, the germanium may be removed by agitating the leach liquor from two to three hours with 2.5 to 3.0 grams per liter of zinc dust. This treatment produces a purification residue assaying .010% to .020% of germanium. This treatment is, however, not applicable to solutions derived from a concentrate feed containing more than .001%.

A further object of the invention is therefore to remove germanium from solutions obtained by treating concentrates containing more than .001% of germanium.

In the present invention, the solution to be purified is agitated in a tank with purifying agents for a period of from two to five hours depending upon the amount of germanium to be removed and the temperature. The higher the temperature, the better is the purification. The solution may be heated if desirable. When the germanium content in the solution has been displaced, the solution is filtered from the residue which contains the germanium and this solution is sent to the electrolyzing cells. The reagents employed in the above outlined purification process may be a zinc or calcium oxide, hydroxide, or carbonate, or the oxide, hydroxide or carbonate of any metal more basic than zinc. Or zinc dust may be employed with or without an addition of copper sulphate, and with or without an addition of the oxide, hydroxide or carbonate of zinc, calcium or of any other metal more basic than zinc; or with the addition or substitution of a solution of cadmium sulphate or of arsenic trioxide in place of the copper sulphate.

As an example of a purification of a zinc sulphate solution containing germanium, a quantity of copper sulphate is added to the leach solution to be purified, until the solution assays .7 to 1.0 grams of copper per liter. 3 to 20 grams per liter zinc dust is then added to the solution, the quantity of zinc dust depending upon the germanium content of the solution. The solution is then filtered giving a filtrate containing 100 grams per liter of zinc and from only a trace to .010 grams per liter germanium, and a purification residue assaying approximately 40% zinc, 10% copper and from .010 to .30% germanium. Copper may be added to the solution as metallic copper or by adding copper sulphate to the leach solution or to the material to be leached or by adding roasted copper bearing ores to the material to be leached or by adding unroasted copper bearing ores to the zinc concentrate prior to calcining or roasting or in any other suitable and convenient manner.

The above method may be modified by adding 1 to 5 grams of zinc oxide per liter to the solution to be purified, or by adding calcium oxide, or calcium carbonate, or the oxide, hydroxide, or carbonate of any metal more basic than zinc, thereupon treating the material as above.

Instead of using copper, cadmium sulphate may be added to the solution to be purified until the latter contains .1 to .3 grams of cadmium per liter or .1 to .3 grams of cadmium as cadmium sulphate may be added to each liter of the solution in addition to the increase in copper content of from .1 to 1.0 grams per liter. The cadmium may be added as cadmium sulphate to the leach solution or to the material to be leached or by adding to the concentrate before roasting, purification residue, or the cadmium sponge recovered from purification residue as described in United States Patent No. 1,343,619. Or these materials may be oxidized and added to the calcine to be leached. Arsenic trioxide may be added to the solution in addition to the copper and zinc dust until the solution assays from .1 to 1.0 grams per liter arsenic.

Instead of using zinc dust the solution may be purified by precipitating the germanium with zinc or calcium oxide, hydroxide or carbonate, or the oxide, hydroxide, or carbonate of any metal more basic than zinc. In this process no zinc dust, copper sulphate or cadmium sulphate need be added to the solution. Treatment with oxides of the above type requires a longer time and higher temperatures than treatment with zinc dust. The residue from this latter process assays from 40% to 60% of zinc and .010 to .30% of germanium.

In the event that the concentrate or calcine contains too high a germanium content for the usual treatment and provided that it may be separated into a portion sufficiently low in germanium for direct treatment with zinc dust and into another portion of high germanium content, the high germanium containing portion may be treated separately by any of the above methods, and the purified solution thus obtained may be mixed with the leach solution from the portion of low germanium content, which may then be treated with zinc dust. In this way, the leach solution from the material of high germanium content is given a double purification. This method is particularly desirable in treating fumes of high germanium content. The leach solution from such material may assay from .010 to .100 grams per liter of germanium and a double purification is almost essential to obtain a solution sufficiently pure for effective electrolysis. To obtain good results for electrolysis, the germanium content should not be over about .0002 grams of germanium per liter.

What I claim is:—

The method of treating zinc sulphate solutions containing a high germanium content in order to render them suitable for electrolytic extraction of zinc, which method consists in separating the solution into a first portion comparatively low in germanium and a second portion comparatively high in germanium, treating the first portion of the solution directly with zinc dust to reduce the germanium contents thereof, treating the second portion with a basic compound of a metal not less basic than zinc, filtering the two portions thus treated, mixing them together and further treating with zinc dust to reduce the germanium content to about .0002 grams of germanium per liter.

In witness whereof, I have hereunto signed my name.

WILLARD E. MITCHELL.